No. 849,384. PATENTED APR. 9, 1907.
J. H. GAULT.
UNIVERSAL JOINT FOR SHAFTS OR SECTIONS OF SHAFTS.
APPLICATION FILED MAY 2, 1906.
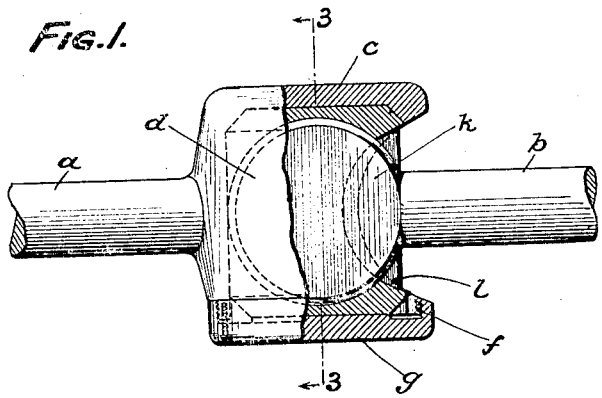
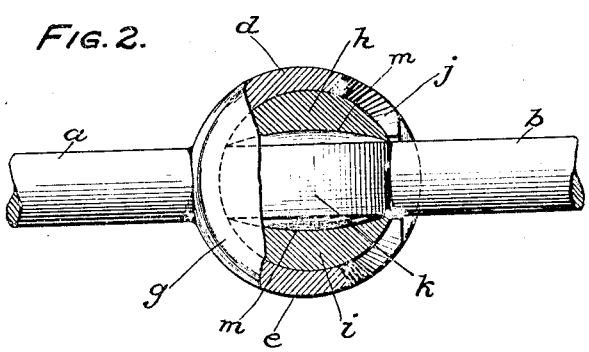
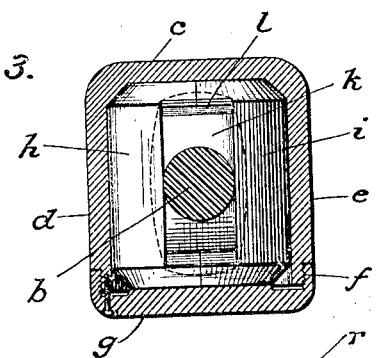
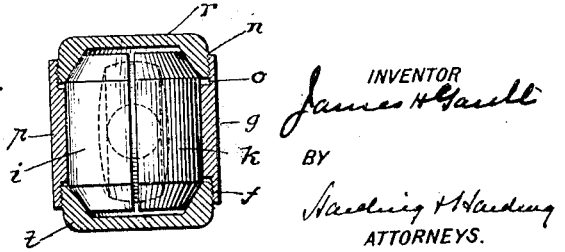
WITNESSES:
Rob't R. Litchel
M. M. Hamilton
INVENTOR
James H. Gault
BY
Harding & Harding
ATTORNEYS.

UNITED STATES PATENT OFFICE.

JAMES H. GAULT, OF PHILADELPHIA, PENNSYLVANIA.

UNIVERSAL JOINT FOR SHAFTS OR SECTIONS OF SHAFTS.

No. 849,384.

Specification of Letters Patent.

Patented April 9, 1907.

Application filed May 2, 1906. Serial No. 314,744.

*To all whom it may concern:*

Be it known that I, JAMES H. GAULT, a citizen of the United States, residing at Philadelphia, county of Philadelphia, and State of Pennsylvania, have invented a new and useful Improvement in Universal Joints for Shafts or Sections of Shafts, of which the following is a full, clear, and exact description, reference being had to the accompanying drawings, which form a part of this specification.

My invention has for its object the production of a universal joint for shafts or sections of shafts which is of simple construction, avoiding the use of pins and nuts and in which the wear is reduced to a minimum by presenting a great area of bearing-surface, and the friction of the wearing parts is reduced to a minimum.

I will first describe the embodiment of my invention illustrated in the accompanying drawings and then point out the invention in the claims.

Figure 1 is a front view of my invention partly broken away. Fig. 2 is a top view of Fig. 1, partly in section. Fig. 3 is a partial section on line 3 3 of Fig. 1. Fig. 4 is a partial section, similar to Fig. 3, with two caps.

$a$ and $b$ are the two shafts or sections of a shaft to be connected together by the universal joint. To the end of the shaft $a$ is connected the open-ended box having the top $c$ and side walls $d$ and $e$, a portion of the walls $d$ and $e$ being cut away to form an opening $j$ for the movement of the shaft $b$. The walls $d$ and $e$ each have a curved extension upon which are the threads $f$, with which mesh threads on the bottom cap $g$. Within this box are the two semicylinders $h$ and $i$, which extend from top to bottom of the box. Between these semicylinders in a cavity $m$, milled into them to receive it, is the lenticular surface $k$, projecting from the end of the shaft or section of shaft $b$. The semicylinders have a cut-away portion $l$ to allow for oscillating movements at right angles to each other of the shafts or sections of shafts $a$ and $b$.

In practice the parts are associated together and in the box in the following manner: The cap $g$ is removed, the two semicylinders, with the lenticular end of the shaft $b$ inserted between them, are inserted in the box through the space formed by the removal of the cap $g$. The cap $g$ is then screwed into position. The vertical change of position of the two shafts is obtained by the movement of the lenticular end of the shaft $b$ on the bearing between the cylinders, while the horizontal change of position of the shaft is obtained by the movement of the cylinders upon the walls of the box. In the form shown at Fig. 4 the top $r$ is a removable cap having the threads $n$, which mesh into threads $o$ on the walls $p$ and $q$. In this case the inner surface of the cap $r$ and the cap $t$ is formed of frusto-conical shape, the upper and lower ends of the semicylinders being also frusto-conical. By this construction if there is any wear of the cylinders it can be taken up by the caps.

Having now fully described my invention, what I claim, and desire to protect by Letters Patent, is—

1. An universal joint for shafts, comprising a box connected to one shaft or section of a shaft, two semicylinders mounted in said box, to rotate horizontally therein, and a projection from the other shaft between said semicylinders, and having a bearing between said cylinders, and movable horizontally with, and vertically between, said cylinders.

2. An universal joint for shafts, comprising a box connected to one shaft or section of a shaft, two semicylinders mounted in said box, to rotate horizontally therein, and a lenticular projection from the other shaft between said semicylinders, and having a bearing between said cylinders, and movable horizontally with, and vertically between, said cylinders.

3. An universal joint for shafts, comprising a box connected to one shaft or section of a shaft, two semicylinders mounted in said box, to rotate therein, and a projection from the other shaft or section, having a bearing between said semicylinders, said semicylinders and box being cut away to allow the projection from, and said shaft to move with said semicylinders and its bearing.

4. An universal joint for shafts, comprising a box connected to one shaft or section of a shaft, two semicylinders mounted in said box, to rotate therein, a projection from the other shaft or section having a bearing between said semicylinders, and a cap for said box, removably secured to said box for the insertion of and securing the parts in said box.

5. An universal joint for shafts, comprising a box connected to one shaft or section of a shaft, two semicylinders mounted in said box, to rotate therein, a projection from the other shaft or section, having a bearing between said semicylinders, and a cap secured by intermeshing threads, with said box for the insertion of and securing the parts in said box.

6. An universal joint for shafts comprising a box connected to one shaft or section of a shaft, two semicylinders mounted in said box, to rotate therein, a projection from the other shaft or section having a bearing between said semicylinders, and caps removably secured forming opposite ends of said box.

7. An universal joint for shafts comprising a box connected to one shaft or section of a shaft, two semicylinders mounted in said box, to rotate therein, the ends of said cylinders being conical, a projection from the other shaft or section, having a bearing between said semicylinders, and caps removably secured forming opposite ends of said box, the inner surface of said caps being conical.

In testimony of which invention I have hereunto set my hand, at Attleboro, on this 18th day of April, 1906.

JAMES H. GAULT.

Witnesses:
HARRY E. CARPENTER,
WALTER E. HILL.